Patented Sept. 15, 1936

2,054,084

UNITED STATES PATENT OFFICE 2,054,084

PRODUCTION OF CARBON BLACK BY THE THERMAL DISSOCIATION OF ORGANIC MATERIALS

John J. Jakosky, Los Angeles, Calif., assignor to Electroblacks, Incorporated, Culver City, Calif., a corporation of Nevada No Drawing. Application July 10, 1933, Serial No. 679,825

5 Claims. (Cl. 204—31)

This invention relates to the production of carbon-black and other products, such as hydrogen and gaseous hydrocarbons, by thermal dissociation of organic materials by means of a localized high temperature zone maintained beneath a body of such material, for example, by means of an electric arc submerged therein. This application is a continuation in part of co-pending application Ser. No. 584,894 filed January 5, 1932.

The process of the present invention is similar to the process described in United States patents to Jakowsky No. 1,597,277 and to Jakosky No. 1,673,245, and comprises a method for producing carbon-black (carbon in extremely finely divided form) and other dissociation products by the thermal dissociation of liquid organic materials. Such dissociation may, for example, be effected by an electric arc discharge between two electrodes preferably submerged in the organic liquid in a suitable form of apparatus after the manner shown in the above-mentioned patents. However, other means may be employed for maintaining the necessary high temperature dissociation zone; for example, a high temperature flame may be established by combustion beneath the surface of the liquid, as described in the second patent above-mentioned.

The process as described in said patents comprises, in general, maintaining a body of liquid carbon-bearing material of the desired composition in a suitable receptacle, and maintaining a localized high temperature zone submerged beneath the surface of such liquid material, resulting in vaporization and dissociation of the material in and immediately around said zone, to form carbon-black and gaseous or liquid dissociation products. The carbon-black thus produced passes almost immediately into the liquid surrounding said zone and remains suspended therein, and as such liquid is at relatively low temperature as compared to said high temperature zone, the carbon-black is thus immediately cooled sufficiently to retain the small particle size and other desirable physical properties which it possesses when first formed. The gaseous products also pass off through the liquid and may be removed and utilized or disposed of in any suitable manner. Such gaseous products ordinarily have a high content of hydrogen and combustible hydrocarbon gases, and possess a high heat of combustion, by reason of which they may be advantageously used as fuel or sold for this purpose at a good price.

The operation may be conducted as a "batch" process on a quantity of liquid material charged into a receptacle, but I prefer to carry it out in a continuous manner, by continually supplying additional liquid organic material to said receptacle and continually removing therefrom liquid containing carbon-black in suspension. The suspension of carbon-black in liquid thus removed may be utilized in the production of printing ink provided the organic liquid is of suitable type for this purpose, as described particularly in the above-mentioned Patent No. 1,673,245, or the carbon-black may be separated from the organic liquid in any suitable manner, for example as described in Patent No. 1,597,277, and may be used for any of the purposes for which high quality carbon-black is suitable.

The fact that the above-described method of dissociation requires that the organic material undergoing dissociation be liquid in nature, has heretofore excluded the use of a number of carbon-bearing compounds which are solid at ordinary temperatures or at the temperatures at which such a material may be maintained during dissociation, and accordingly the principal object of the present invention is to provide for production of carbon-black by thermal dissociation of a suitable liquid containing such a solid carbon-bearing material in solution.

For the purpose of the present description, and as used in the accompanying claims, the expression "carbon-bearing liquid" will be taken to mean either a simple carbon-bearing liquid such as petroleum oil, alcohol, or the like, or a simple or complex carbon-bearing liquid containing other carbon-bearing materials in solution.

A further object of the invention is to provide for utilization of solid carbon-bearing materials in the production of carbon-black by thermal dissociation of such materials in a suitable liquid solvent whereby the cost of production of carbon-black may be materially lowered by virtue of the fact that numerous such solid materials are obtainable at a relatively low cost as compared with liquid carbon-bearing materials which have been previously used in such production of carbon-black.

Such a solid carbon-bearing material may comprise naphthalene, anthracene, paraffin, waxes, resins, resinous gums, natural solid mineral hydrocarbons such as gilsonite, or asphalt, still residuum such as is obtained in petroleum refining, wax residues such as are obtained in the refining of lubricating oils, and the like. The liquid carbon-bearing solvents may comprise gasoline, kerosene, naphtha, vegetable or animal oils, alcohols, ethers, or the like.

A further object of the invention is to provide for increased efficiency of production of carbon-black by thermal dissociation of a carbon-bearing liquid body by increasing the carbon content of a dissociable liquid by dissolving therein a solid high-carbon-content material or a solid carbon-bearing material which is more readily dissociated than said liquid.

According to the present invention numerous carbon-bearing compounds are made available for use in the production of carbon-black, and many of such compounds are obtainable at a very low cost. For example, the present invention contemplates the use of the carbon-bearing material which may be obtained from still residuum, naturally occurring hydrocarbons such as gilsonite, or the like. Such materials are preferably taken into solution in a suitable solvent such as kerosene, Diesel oil, or the like, and filtered to remove mechanically suspended foreign matter such as particles of coke, carbon, sand, or other undissolved impurities, and then subjected to dissociation.

I have found that the efficiency of carbon-black production per unit of energy consumption is increased by dissolving solid carbon-bearing materials in a convenient carbon-bearing solvent, which is probably due in part to the actual increase in chemically combined carbon content per unit volume of the solution undergoing dissociation by addition of high molecular weight compounds which are more easily dissociated, and in part to the fact that most of these added solid materials contain an appreciable quantity of unsaturated compounds which are more easily dissociated by thermal means than are the saturated compounds heretofore normally employed. Accordingly, the preferred embodiment of this invention contemplates production of carbon-black by dissociation of dissolved solid materials containing compounds having a relatively high proportion of multiple-bonded carbon atoms, such as naphthalene or one of the higher members of the unsaturated aliphatic group. At the same time, I have found that paraffin may be dissolved in kerosene or Diesel oil, for example, and a relatively high production efficiency obtained even though the paraffin is substantially saturated, due mainly to the increase in carbon content of the mixture.

The present invention makes it possible to obtain carbon-black by dissociation of relatively high molecular weight compounds (such high molecular weight compounds having been found dissociable to form a given quantity of carbon-black at a lower energy expenditure than is required for relatively low molecular weight compounds which have been hitherto used) by solution of such a compound or material in a lighter vehicle. The solid carbon-bearing materials alone, in general, are not susceptible to treatment according to the methods set forth in the above-referred-to patents for the reason that the material must necessarily be in a fluid state at the operating temperatures involved.

As a specific example of the practice of the present invention, I may dissolve approximately three pounds of naphthalene in a gallon of Diesel oil, subject the mixture to thermal dissociation, as by means of an electric arc as above outlined, and then recover the carbon-black by any suitable means as by one of the methods set forth in one of the above-mentioned patents. The per cent or proportion of the solid material in the liquid solvent may be varied with the temperature of treatment, and I preferably use a solution containing a maximum amount of such dissolved solid material, that is, a saturated solution, or substantially saturated. The upper limit of the solid material will be so selected that undue separation or crystallization of the material will not occur in the apparatus in which the dissociation is conducted.

According to a modified example of the practice of the present invention, I may dissolve the solid material in such proportions as to form an approximately saturated solution at a superatmospheric temperature but below the elevated temperature which the mixture attains during the dissociation operation, and subject the mixture to dissociation for a period sufficient to cause dissociation of sufficient amount of the solid material so that the solution is not supersaturated at atmospheric temperature. In this manner, I may dissolve approximately four pounds of naphthalene per gallon of Diesel oil at a suitable superatmospheric temperature such as 75° C., conduct dissociation of the mixture until the naphthalene content is reduced to approximately two pounds per gallon, and then subject the mixture to treatment to recover the carbon-black. This practice of the present invention provides that high dissociation efficiency may be obtained in the dissociation step, while eliminating the necessity for handling a saturated or super-saturated solution in subsequent steps of the process, where the temperature may fall to atmospheric temperature.

The carbon-black may be recovered from the liquid by means of filtration, extraction with a suitable solvent, by centrifugal means, by evaporation, or combinations of such treatments. In the event that the separation is made by evaporation, the separation of the solid material from the carbon-black is facilitated by the presence of the solvent liquid material, which may be evaporated and thus assist in carrying off vaporized solid material.

When a material such as still residuum is utilized, a suitable amount of the material may be subjected to the solvent action of the desired liquid material, such as kerosene, Diesel oil or the like, the resulting mixture subjected to a separating treatment to remove undissolved material such as sand, coke or the like, and the solution subjected to dissociation. The separating operation may comprise filtration, gravity separation, or centrifugal treatment, the object being to remove such material as would be deleterious if allowed to contaminate the carbon-black which is formed in the material during dissociation.

The present invention is not limited to production of carbon-black by the dissociation of hydrocarbon materials, for the reason that any one of numerous resins such as for example, copal resins, or coumaron resins may be dissolved in a suitable solvent such as alcohol or turpentine (according to the particular type of resin employed) and the resulting solution subjected to dissociation. This feature makes possible the production of carbon-black dispersed in a vehicle adapted for use as a varnish, or adaptable to mixture with varnishes or lacquers for obtaining the desired degree of pigmentation.

When the process of the present invention is carried out in the production of printing inks, pigmented varnishes, or other material in which the carbon-black is retained in suspension in part or all of the liquid vehicle remaining after removal from the dissociation apparatus, the dissociation is preferably continued for a sufficient period of time to provide substantially complete dissociation of the solid carbon-bearing material, or to such a point that the quantity of remaining solid carbon-bearing material is non-deleterious in the final product.

I claim:

1. The method of producing carbon-black which comprises subjecting a material containing a solid carbon-bearing material and insoluble impurities to the solvent action of a carbon-bearing liquid, separating said insoluble impurities from the resulting solution, and subjecting said solution to high temperature in a localized zone beneath the surface thereof to cause dissociation of said solution to form carbon-black.

2. The method of producing carbon-black which comprises subjecting a solid carbon-bearing material of the type comprising still residuum, wax residues and the mineral gilsonite, to the solvent action of a carbon-bearing liquid, said material containing solid impurities insoluble in said liquid, separating undissolved solid impurities from the resulting solution, and subjecting the resulting solution to high temperature in a localized zone beneath the surface thereof to cause dissociation of said solution to form carbon-black.

3. The method of producing carbon-black which comprises dissolving naphthalene in a carbon-bearing liquid, subjecting the resulting solution to a high temperature in a localized zone beneath the surface thereof to cause dissociation of said solution to form carbon-black.

4. The method of producing carbon-black which comprises dissolving copal resin in alcohol, producing an electric arc discharge in a localized position beneath the surface of the resulting solution, to cause dissociation of portions thereof and formation of carbon-black, and separating the carbon-black so produced from the remaining solution.

5. The method of producing carbon-black which comprises dissolving a solid carbon-bearing solute in a heated carbon-bearing liquid solvent in an amount in excess of the solubility of such solute in such solvent at atmospheric temperature, said solute being more easily dissociable by heat than said solvent, subjecting the heated solution to a high temperature in a localized zone beneath the surface thereof to cause dissociation of the solute to form carbon-black while causing relatively little dissociation of solvent so that the concentration of solute in said solvent is reduced below the solubility of such solute in such solvent at atmospheric temperature, and separating the carbon-black so produced from the remaining solution.

JOHN J. JAKOSKY.